United States Patent Office 3,447,075
Patented May 27, 1969

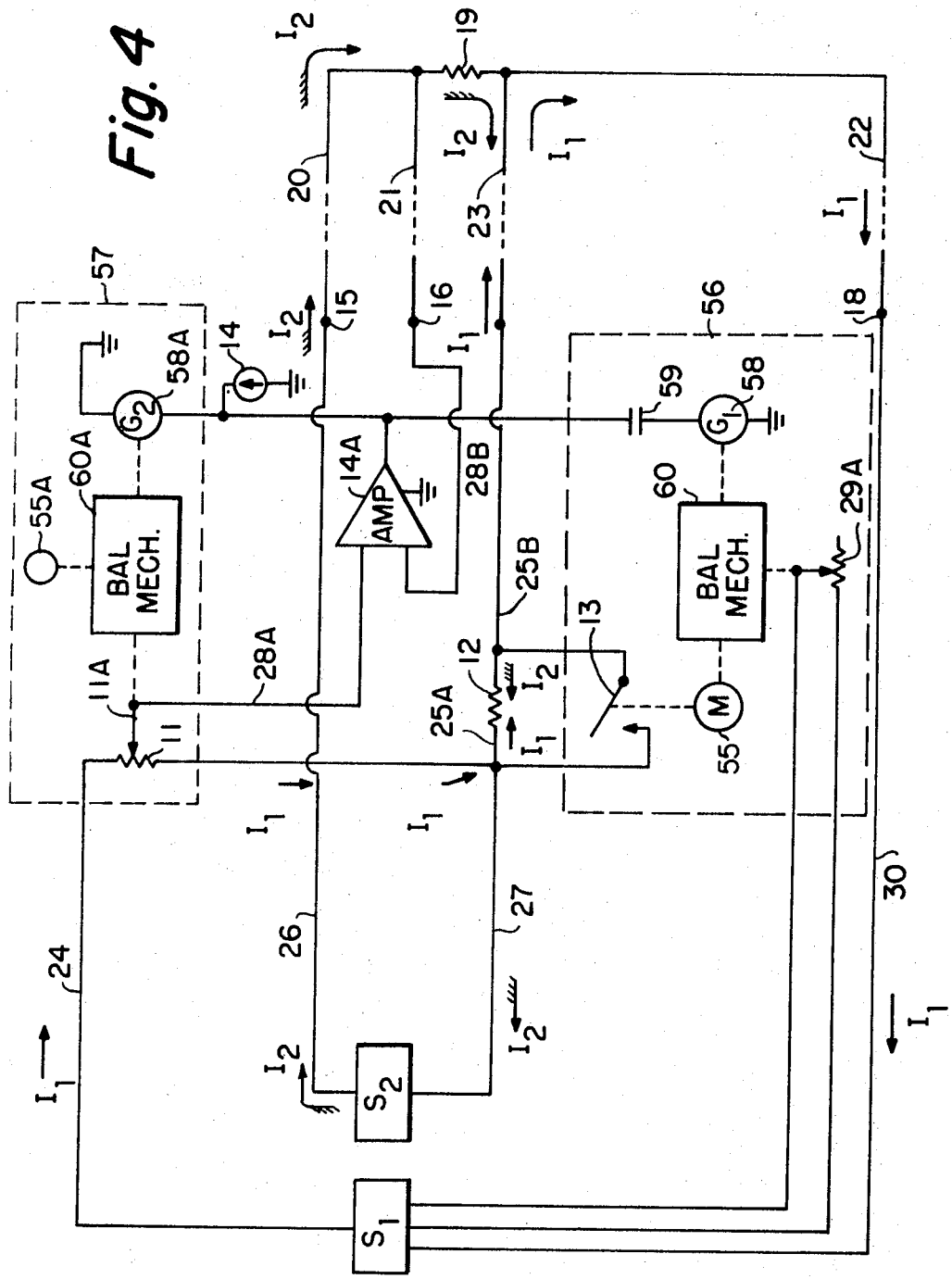

3,447,075
EQUAL CURRENTS POTENTIOMETER CIRCUITS FOR MEASUREMENTS OF RESISTANCES—PARTICULARLY TEMPERATURE-SENSITIVE RESISTANCES
Albert J. Williams, Jr., Philadelphia, and George C. Mergner, Glenside, Pa., assignors to Leeds & Northrup Company, Philadelphia, Pa., a corporation of Pennsylvania
Filed Mar. 29, 1967, Ser. No. 626,774
Int. Cl. G01r 27/02
U.S. Cl. 324—62　　　　　　　　　　　　　9 Claims

ABSTRACT OF THE DISCLOSURE

Potentiometer-networks for the measurement of temperature sensitive four-terminal resistances with circuitry having a pair of current loops, each of which loops includes the unknown resistance connectable in each loop through two different opposite terminals, and a balanceable loop including a detector and said unknown resistance, said resistance being connectable in this last named loop through two terminals, each of which is common to a different current loop. Such an arrangement is provided to minimize lead resistance errors.

BACKGROUND OF THE INVENTION

Field of the invention

Though not limited thereto, the invention is particularly suited for four-terminal resistance measurements, such as used in resistance-thermometry to minimize lead resistance errors.

Description of prior art

In resistance-thermometry, for example, the resistance of the connecting leads and variations of that resistance are significant factors to be considered for precise determination of temperature. Special bridge circuits, such as the Mueller and Smith bridges, have been used, but their circuitry is quite complicated and expensive.

SUMMARY OF THE INVENTION

In accordance with the present invention, the magnitude of the unknown resistance is determined by a potentiometer network having a first current loop including a constant-current source, a calibrated resistance, and a current-comparison resistance; and a second current loop including a second constant-current source, the aforesaid comparison-resistance and the unknown resistance. A detector is included in a balanceable loop including the unknown resistance, the comparison-resistance and the calibrated resistance. In measurement of the unknown resistance, the balanceable loop is balanced by adjustment of the calibrated resistance for a null response of the detector. Validity of the balance is checked by substantially varying the magnitude of the comparison-resistance; and if there is disturbance of the balance, equality of the outputs of the current sources is restored by adjustment of at least one of them.

When the unknown resistance is remote with a pair of leads from each terminal, one lead of one pair is traversed solely by current from one constant-current source, and the other lead of that pair is traversed by opposed currents from both constant-current sources: and one lead of the other pair is traversed solely by current from the other constant-current source, and the other lead of such other pair is traversed solely by current which is of zero value for balance of the balanceable loop.

The invention also includes other features hereinafter described including provision for maintaining constant impedance of the balanceable loop, reversal of current sources, and for direct reading of percent or ratio rather than or in addition to absolute resistance values or condition values.

BRIEF DESCRIPTION OF THE DRAWINGS

For a more detailed understanding of the invention, reference is made in the subsequent description of preferred embodiments thereof to the accompanying drawings in which:

FIG. 4 is a schematic illustration of an automated version of FIG. 1.

DESCRIPTION OF PREFERRED EMBODIMENTS

Figure 1:
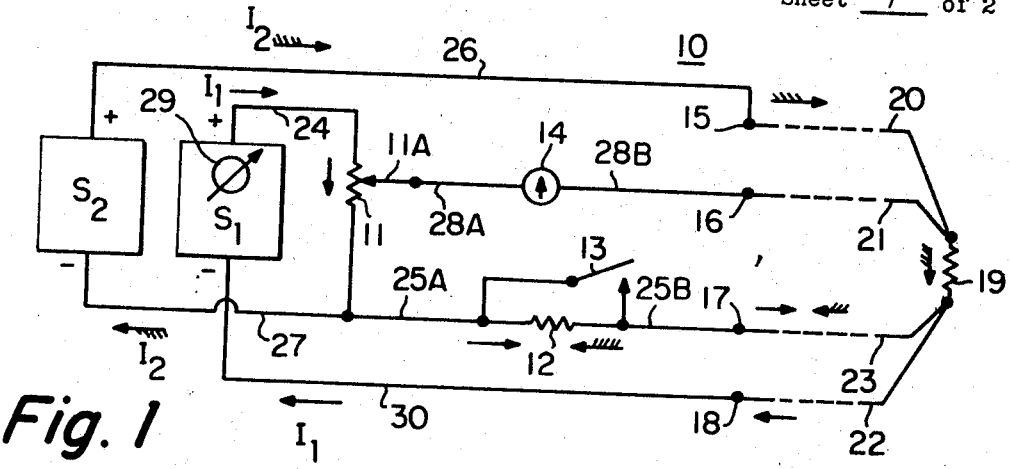
FIG. 1 is a schematic of the basic measuring circuitry including a remote unknown resistance.

Referring to FIG. 1, the basic potentiometer circuitry includes a calibrated resistance 11, a current-comparison resistance 12, the shunting switch 13, the unbalanced detector 14 and two constant-current sources S1, S2. At least one of the sources S1, S2 is provided with adjustable means 29 for variation of its output current to effect equality of the output currents of the two sources. Some or all of these components may be comprised in a unit having terminals 15–18 for connection to an external unknown resistance 19 to be measured. For purposes of the immediately following discussion, it is to be assumed that resistance 19 is temperature-sensitive, is disposed remotely from the measuring unit, and is provided with two pairs of leads 20, 21 and 22, 23 respectively connected to its opposite ends.

The source S1 supplies current I1 (represented by the unfeathered arrows) through a current loop including, in series, conductor 24 from one terminal of source S1, calibrated resistance 11, conductor 25A, comparison resistance 12, conductor 25B to terminal 17, lead 23 to resistance 19, return lead 22 to terminal 18, and conductor 30 to the other terminal of source S1. The source S2 supplies current I2 (represented by feathered arrows) to a second current loop including, in series, conductor 26 from one terminal of source S2, lead 20 from terminal 15 to one end of unknown resistance 19, resistance 19, lead 23 from the other end of resistance 19 to terminal 17, comparison resistance 12 and conductor 27 to the opposite terminal of source S2. As shown, the current sources S1, S2 are so poled that their respective terminals of like polarity are presented to opposite ends of comparison resistance 12. Thus, the currents I1, I2, as flowing through comparison resistance 12 common to both current loops are there in opposition.

The detector 14 is in a balanceable loop including conductor 28A from the adjustable contact 11A of calibrated resistance 11, detector 14, conductor 28B to terminal 16, lead 21 to the upper end of unknown resistance 19, resistance 19, lead 23 from the lower end of resistance 19 to terminal 17, conductor 25B to comparison resistance 12, comparison resistance 12, conductor 25A to the lower end of calibrated resistance 11 and the lower part of resistance 11 to contact 11A. In that branch of this balanceable loop circuit from the lower ends of resistances 11 and 19, and including the comparison-resistance 12, the currents I1 and I2 are in opposition and thus so long as these currents are equal, there is no voltage drop in such branch. In such case, with contact 11A adjusted to obtain null response of detector 14, the voltage drop across the effective or lower portion of calibrated resistance 11 is exactly equal to the voltage drop across unknown resistance 19. The position of contact 11A relative to resistance 11 is, therefore, directly related to the value of unknown resistance 19 or of the value of the condition to which it is responsive.

The validity of a measurement is checked by closing switch 13 which is in shunt to resistance 12 as forming the major part of the total resistance between the lower ends of resistances 11 and 19. If the null response of the detector 14 is not disturbed upon such closure, the setting or position of contact 11A truly corresponds with the existing magnitude of the unknown resistance or the condition it represents. If, on the other hand, the null response of detector 14 is disturbed upon such closure, the output current of one or the other of sources S1, S2 is varied, as by means 29, and the contact 11A readjusted until there is a null response for both the open and closed positions of switch 13. For such new balance position of contact 11A, the resistance of the effective lower portion of resistance 11 exactly matches the existing value of resistance 19.

Neither the resistance value nor the stability of current-comparison resistance 12 is critical; in practice, the value of resistance 12 may be of the same order as, or approximately equal to, the mean value of unknown resistance 19 or the mid-range value of calibrated resistance 11. The maximum value of calibrated resistance 11 should be at least equal to the maximum value of unknown resistance 19 for the expected range of measurement. Preferably and as shown, the calibrated resistance 11 is used as a voltage-divider: it may be used as a rheostat by connecting conductor 24 to adjustable contact 11A, but this increases the severity of the regulation requirement imposed upon the constant-current source S1. Regulated sources suitable for use as the constant-current sources S1, S2 are known and need not be described, for example, the Evenvolt 930 Series Programable Constant Current Supply.

It is to be noted that with this equal-currents potentiometer circuit, a valid resistance measurement does not depend upon a fixed length of the leads 20, 21, 22, 23 or upon constancy of the resistance of such leads. This is so because: the current-supply leads 20, 22 are external to the balanceable loop; there is no current through lead 21 at balance; and the currents I1, I2 as traversing lead 23 are made equal and opposite. The equality of currents I1, I2, rather than the absolute value of either of them, is the condition required for valid measurement. Therefore, this potentiometer circuit does not require an expensive standard cell or other contant voltage source as a calibrating reference. This equal currents potentiometer circuit and its measuring techniques are simpler than required for the complex bridge circuits, such as the Mueller and Smith bridges, devised for minimizing lead errors in resistance-thermometry. However, it is to be understood that the equal-currents potentiometer circuits herein disclosed are not limited to use in resistance-thermometry, but may be used for other four-terminal resistance measurements. For two-terminal resistance measurements, jumpers may be connected between terminals 15, 16 and 17, 18 respectively.

Figure 2:
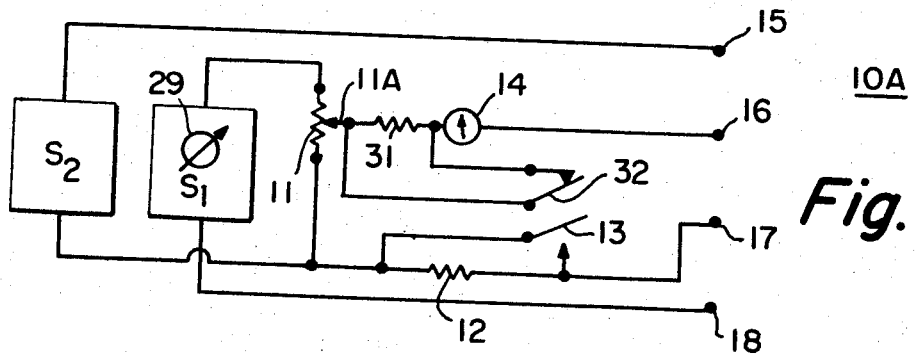
FIGS. 2 and 3 are similar to FIG. 1 but include additional components for purposes herein discussed.

Except in respects below discussed, the equal-currents potentiometer circuit 10A shown in FIG. 2 is the same as FIG. 1 with like elements identified by the same reference characters. In FIG. 2, the additional resistance 31 is interposed in one or the other of conductors 28A, 28B in the upper branch of the balanceable loop including the detector 14. The switch 32 in shunt to resistance 31 is ganged with switch 13 and is closed when switch 13 is opened, and vice versa. In magnitude or value, the resistances 12 and 31 are approximately equal so that when switch 13 is actuated, as above described, to check the validity of a balance, the input impedance into which the detector 14 is looking remains constant or practically so. Thus, the offset, damping and sensitivity characteristics of the detector 14 are the same for both positions of switches 13, 32.

Figure 3:
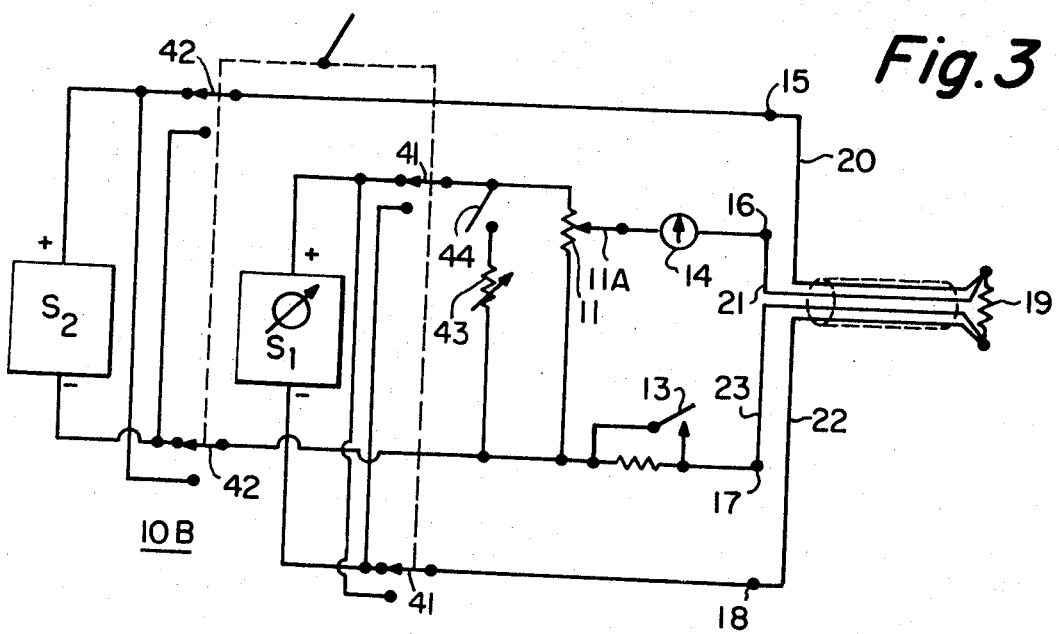

Except in respects below discussed, the equal-currents potentiometer circuit 10B shown in FIG. 3 is the same as FIG. 1 with like elements identified by the same reference characters. In FIG. 3, the switch 41 is provided to reverse the poling of the constant-current source S1, and switch 42 is provided to reverse the poling of constant-current source S2. The switches 41, 42 are ganged for concurrent reversal of the polarity of both sources S1, S2. Such reversal of the polarity of the current sources discloses the presence of any thermoelectric voltages. Such thermoelectric voltages have an effect on the detector 14 which persists even in the absence of both current sources. These voltages can, therefore, lead to a balance position for the potentiometer which is too large for the normal connection of sources S1, S2 and lead to a balance position which is too small for the reversed connection of sources S1, S2. Since the detector deflection as the result of contribution of thermoelectric voltages persists in absence of both current sources, a true resistive balance is indicated where there is no change in detector deflection when equal current sources are connected. Alternatively, true resistive balance is indicated when there is no change in detector deflection when the equal current sources are connected each in the reversed direction. An elegant method of achieving this true resistive balance is to position contact 11A so that the detector reading is unchanged when the polarities of equal sources S1, S2 are concurrently reversed. In this modification shown in FIG. 3, the criteria for true balance is that a response of detector 14 is not disturbed either for change in state of polarity reversing switches 41, 42 or for change in state of switch 13. Reversing switches 41, 42 may be included in the circuitry of FIGS. 1 and 2 for like purpose.

In FIG. 3 as thus far described, as well as in FIGS. 1 and 2, the resistance 11 may be calibrated for direct reading of the resistance value of unknown resistance 19 or for direct reading of temperature, pressure or other condition when resistance 19 is a transducer responsive to such condition. Any of these equal-currents potentiometer circuits may be modified, as shown in FIG. 3, by addition of a stable adjustable resistance 43 connectable as by switch 44 in shunt to the calibrated voltage-divider resistance 11. With the equal-currents potentiometer so modified, the ratio of the values of a condition-responsive resistance 19 may be measured directly. For example, directly to measure the ratio $R_T/R_O$ (where $R_O$ is the value of thermometer resistance 19 at the ice point and $R_T$ is the value of resistance 19 at higher temperature), the procedure is as follows:

(1) Place the resistance 19 in an environment such as a melting ice bath to bring its temperature to the ice point.

(2) Place the calibrated dials of the resistance 11 for the reading desired to correspond to an $R_T/R_O$ of unity, preferably some factor of 10 and close switch 44.

(3) Adjust the circuit for equality of current as previously described.

(4) Adjust for null balance in the loop including resistances 11 and 19 as previously described except that the magnitude of resistance 43 is adjusted to obtain a balance condition rather than contact 11A.

(5) Resistance 19 may now be removed from the ice bath, and its $R_T/R_O$ value in other environments measured by following the procedure described for resistance measurement. The new value on the calibrated dials of resistance 11 divided by the value set in step 2 above constitutes the $R_T/R_O$ ratio.

For such direct reading of ratios, the associated chart or scale for resistance 11 may be marked in terms of percent or ratio rather than or in addition to absolute resistance values or condition values.

For continuous monitoring and/or controlling of the magnitude of a condition to which resistance 19 is responsive, any of the equal-currents potentiometer networks 10, 10A, 10B may have automation added to a lesser or greater extent such as; periodic opening and closing of checking switch 13; adjustment of output setting means 29 of source; rebalancing of contact 11A without or with periodic actuations of reversing switches 41, 42.

As exemplary of an automated system including an equal-currents potentiometer network, reference may be had to FIG. 4. The circuitry and mode of operation are basically the same as in FIG. 1 and corresponding elements are identified by the same reference characters. Accordingly, the discussion of FIG. 4 is concerned principally with additional components disclosed in FIG. 4.

The unbalance detector 14A is a stable high-gain amplifier whose input is any voltage unbalance that may exist between adjustable contact 11A of the calibrated resistance 11 and terminal 16. The checking switch 13 is periodically opened and closed at low-frequency, for example, once per second, by motor 55.

So long as the currents I1, I2 through the comparison resistor 12 are equal, a steady deflection of center-zero meter 14 in the output circuit of amplifier 14A is indicative of the sense of unbalance between the unknown or temperature-sensitive resistance 19 and that part of the calibrated resistance 11 included in the balanceable loop. An operator may then adjust contact 11A in direction to reduce the steady deflection to zero with assurance the reading of the calibrated resistance 11 is a valid measurement of resistance 19.

If, however, the pointer of meter 14 is vibrating or pulsing at any point in its range of movement, the operator is thus informed that the currents I1, I2 are not equal. The operator would then vary the output current of source S1, for example, as by adjustment of resistance 29A until the deflection became steady. Then, if necessary, the calibrated resistance 11 would be adjusted for a steady null response. At such steady balance, the reading of calibrated resistance 11 is a valid measurement of resistance 19.

As thus far described, the system of FIG. 4 is semi-automated and facilitates measurements by a human operator observing the output meter 14 of unbalance amplifier 14A and manually adjusting calibrated resistance 11 and the output of constant-current source S1.

For fully-automated operation, the output of amplifier 14A of the unbalance detector is applied to two rebalancing systems 56, 57 respectively responsive to the AC and DC components of the output of unbalance-amplifier 14A. Specifically, the rebalancing system 56 is similar to that shown in Wunsch Patent 2,285,482. Capacitor 59 in series with galvanometer 58 in an output circuit of unbalance-amplifier 14A blocks the DC output component, but the pulse component, due to operation of switch 13, effects ballistic deflection of the galvanometer needle while free of clamping mechanism. While the needle of galvanometer 58 is clamped, the motor 55 is effective to adjust resistance 29A in direction to adjust the output current I1 of source S1 toward equality with current I2.

The time intervals during which the rebalancing system 56 is operative for equalization of currents I1, I2 are spaced in time and during each of the intervening time intervals the rebalancing system 57 is operative for adjustment of the calibrated resistance 11.

The rebalancing system 57, except for omission of switch 13 and capacitor 59, is similar to that of rebalancing system 56 and corresponding elements are identified by the same reference characters plus the suffix A. The details of the needle-clamping mechanism, the clutch mechanism for coupling the motor to the adjustable slidewire and so on are fully set forth in the aforesaid Wunsch patent and need not be repeated here.

What is claimed is:

1. A potentiometer network for measuring the magnitude of an unknown resistance comprising:
   a calibrated resistance having adjustable contact means;
   a current-comparison resistance;
   first and second constant-current sources, at least one of which has associated output-adjusting means for effecting equality of the current outputs of both sources;
   a first current-loop including, in series, the first of said constant-current sources, said calibrated resistance and said current-comparison resistance;
   a second current-loop including, in series, the second of said constant-current sources, said unknown resistance and said current-comparison resistance, said current-sources having their respective terminals of like polarity presented to opposite ends of said current-comparison resistance for opposed flow therethrough of their respectively supplied currents;
   unbalanced-detecting means connected in a balanceable loop including, in series, said unknown resistance, said current-comparison resistance, adjustable contact means, and at least a portion of said calibrated resistance; said balanceable loop, in measurement of the magnitude of said unknown resistance, being balanced by adjustment of said adjustable contact means; and
   checking means operable substantially to change the effective magnitude of said comparison resistance, the continuance of a null response by said unbalance detecting means upon operation of said checking means being indicative of true measurement and the disturbance of the null-response being indicative of need to restore equality of the outputs of said current sources by adjustment of said associated adjusting means.

2. A potentiometer network as in claim 1 in which the checking means is a first switch in shunt to said current-comparison resistance and operable to ON and OFF states.

3. A potentiometer network as in claim 2 which additionally includes in said balanceable loop and externally of said current loops
   a matching resistance equal to said current-comparison resistance,
   a second switch in shunt to said matching resistance, and
   means for operating said first and second switches concurrently to opposite states to maintain a constant impedance of said balanceable loop as seen by said unbalance-detecting means.

4. A potentiometer network as in claim 1 additionally including switching means for concurrently reversing the polarity of both of said constant-current sources as respectively connected in said first and second current loops so as to determine the true resistive null in presence of thermoelectric voltages.

5. A potentiometer network as in claim 1 in which said calibrated resistance is a voltage-divider whose total resistance is continuously in said first current loop and a variable portion of which is included in said balanceable loop in dependence upon the setting of said adjustable contact means.

6. A potentiometer network as in claim 1 in which said unknown resistance is that of a transducer responsive to temperature or other condition, in which the calibrated resistance has a ratio scale, and which additionally includes:
   a stable reference resistance, and
   means for connecting said stable reference resistance in shunt to said calibrated resistance, the effective value of the shunted calibrated resistance corresponding with the magnitude of said unknown resistance at a reference value of said condition, the true balance of said balanceable loop at an existing value of said condition providing a direct measurement of the ratio $R_T/R_O$ where $R_T$ is the magnitude of the unknown resistance at the existing value of said condition and $R_O$ is the magnitude of the unknown resistance at said reference value of the condition.

7. A potentiometer network as in claim 1 in which said unknown resistance is remote and has a pair of leads from each terminal, one lead of one pair being traversed solely by current from said second constant-current source and the other lead of that pair being traversed by the opposed currents from both of said constant-current sources; one lead of the other pair being traversed solely by current from said first constant current source and the other lead of such other pair being traversed solely by current which becomes of zero value upon balance of said balanceable loop.

8. A potentiometer network as in claim 3 additionally including switching means for concurrently reversing the polarity of both of said constant-current sources as respectively connected in said first and second current loops so to determine the true resistive null in presence of thermoelectric voltages.

9. A potentiometer network as in claim 6 additionally including switching means for concurrently reversing the polarity of both of said constant-current sources as respectively connected in said first and second current loops so to determine the true resistive null in presence of thermoelectric voltages.

References Cited

UNITED STATES PATENTS

| | | | |
|---|---|---|---|
| 2,687,510 | 8/1954 | Hoge | 324—62 X |
| 2,930,233 | 3/1960 | Knudsen | 324—62 X |
| 3,350,927 | 11/1967 | Senour | 324—62 X |

RUDOLPH V. ROLINEC, *Primary Examiner.*

E. E. KABASIEWICZ, *Assistant Examiner.*

U.S. Cl. X.R.

73—362; 324—63